United States Patent [19]

Verdina et al.

[11] Patent Number: 5,038,443
[45] Date of Patent: Aug. 13, 1991

[54] JIFFY SURE GRIP LINE HOLDER

[76] Inventors: Salvatore Verdina, 920 18 St., Union City, N.J. 07087; George Spector, 233 Broadway, New York, N.Y. 10007

[21] Appl. No.: 487,870

[22] Filed: Mar. 5, 1990

[51] Int. Cl.⁵ ............................................. F16G 11/00
[52] U.S. Cl. .............................. 24/134 R; 24/132 R; 24/497; 24/510
[58] Field of Search ............... 24/134 R, 532, 132 R, 24/132 AA, 134 KB, 489, 497, 499, 507, 508, 509, 510

[56] References Cited

U.S. PATENT DOCUMENTS

| | | | |
|---|---|---|---|
| 1,189,679 | 7/1916 | Furey | 24/134 R |
| 1,229,690 | 6/1917 | Waskom | 24/134 R |
| 1,250,876 | 12/1917 | Hicks | 24/134 R |
| 1,434,802 | 11/1922 | Bear | 24/134 R |
| 1,599,342 | 9/1926 | Muhlfeld | 24/134 R |
| 2,051,330 | 8/1936 | Cooper | 24/134 R |
| 3,852,943 | 12/1974 | Healy | 24/134 R |

Primary Examiner—Laurie K. Cranmer

[57] ABSTRACT

A jiffy sure grip line holder is provided and consists of a spring for biasing a handle end of a lever that has an end of a clothes line tied thereto away from a handle end of another lever so that the jaw ends of the two levers will come together to grip an adjustable end of the clothes line therebetween.

4 Claims, 1 Drawing Sheet

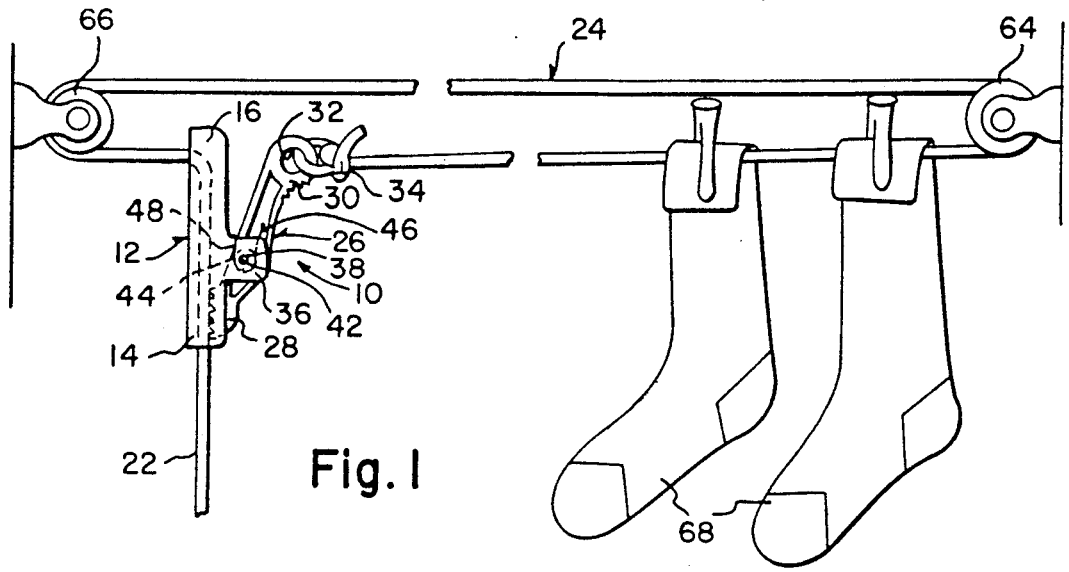
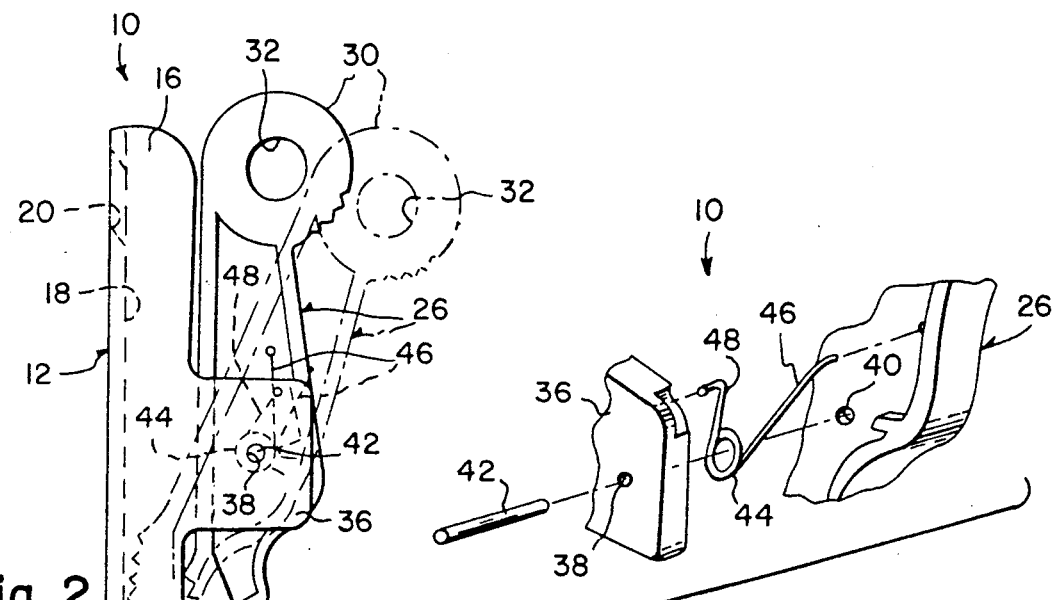
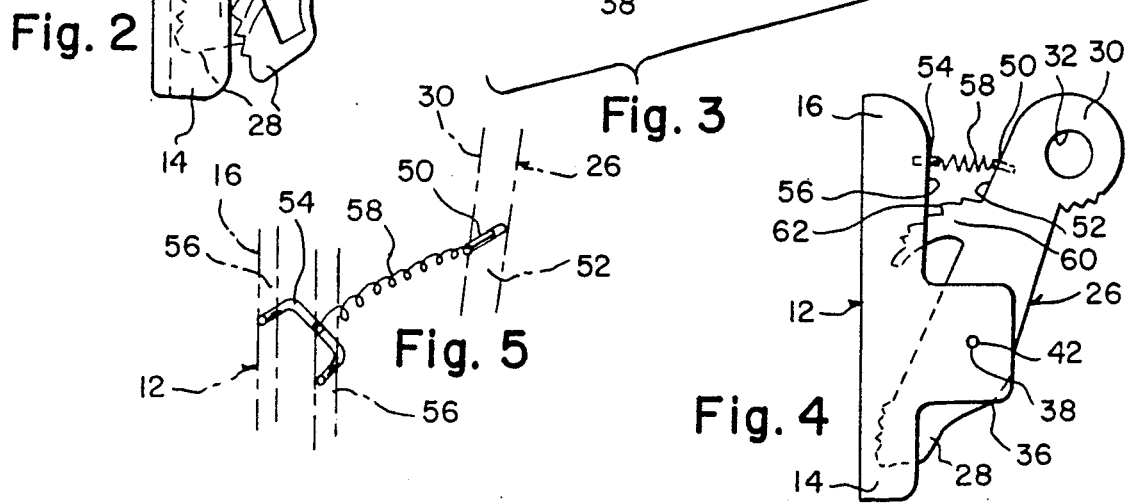

JIFFY SURE GRIP LINE HOLDER

BACKGROUND OF THE INVENTION

The instant invention relates generally to rope take up clamps and more specifically it relates to a jiffy sure grip line holder which provides a more positive lock to a clothes line.

There are available various conventional rope take up clamps which do not provide the novel improvements of the invention herein disclosed.

SUMMARY OF THE INVENTION

A primary object of the present invention is to provide a jiffy sure grip line holder that will overcome the shortcomings of the prior art devices.

Another object is to provide a jiffy sure grip line holder which permits quick adjustment of tension on a clothes line by utilizing a spring therein to make a more positive hold on the adjustable end of the clothes line.

An additional object is to provide a jiffy sure grip line holder in which the spring prevents the holder from causing the adjustable end of the clothes line from slipping out of the holder.

A further object is to provide a jiffy sure grip line holder that is simple and easy to use.

A still further object is to provide a jiffy sure grip line holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention installed on a clothes line.

FIG. 2 is an enlarged side view of just the invention.

FIG. 3 is a perspective view of the parts of the holder disassembled and broken away.

FIG. 4 is a side view of a modification which includes an automatic tension take up and another type of spring mechanism.

FIG. 5 is a perspective view of just the spring mechanism showing how the pins fit into the levers.

DETAILED DESCRIPTION OF THE PREFERRED EMBODIMENTS

Turning now descriptively to the drawings, in which similar reference characters denote similar elements throughout the several views, FIGS. 1 through 3 illustrate a jiffy sure grip line holder 10 consisting of a first lever 12 being of a channel construction, with a jaw formed at one end 14 and a handle formed at another end 16. The first lever 12 has a longitudinal slot 18 therethrough and an aperture 20 in the handle end 16 at a right angle to the longitudinal slot 18 so as to receive an adjustable end 22 of a clothes line 24 therethrough. A second lever 23 is of a flat construction provided with a ratcheted jaw formed at one end 28 and a handle formed at another end 30. The second lever 26 has a transverse aperture 32 in the handle end 30 for tying another end 34 of the clothes line 24 thereto.

A pair of ears 36 extend from the first lever 12 and have aligned holes 38 therethrough, while the second lever 26 has a hole 40 therethrough. A pivot pin 42 extends through the aligned holes 38 in the ears 36 and the small hole 40 in the second lever 26. The second lever is spaced from the longitudinal slot 18 in the first lever 12 whereby the first lever 12 and the second lever 26 will be pivotally attached together near their centers.

A torsion spring 44 is carried on the pivot pin 42 and has one arm 46 engaged with the second lever 26 and another arm 48 engaged with one of the ears 36. The spring 44 biases the handle end 30 of the second lever 26 away from the handle end 16 of the first lever 12 so that the ratcheted jaw 28 of the second lever 26 will normally stay within the longitudinal slot 18 of the first lever 12 to grip the adjustable end 22 of the clothes line 24, until the handle end 16 of the first lever 12 and the handle end 30 of the second lever 26 are manually squeezed together to send the ratcheted jaw 28 of the second lever 26 away from the longitudinal slot 18 to release the adjustable end 22 of the clothes line 24.

FIGS. 4 and 5 show a modification being a substitutions for the spring 44 which includes a first post 50 extending into an inner edge 52 of the handle end 30 of the second lever 26. A second C-shaped post 54 extends into the inner edges 56 of the handle end 16 of the first lever 12. A compression spring 58 is affixed to and extends between the first post 50 and the second C-shaped post 54. The spring 44 biases the handle end 30 of the second lever 26 away from the handle end 16 of the first lever 12.

An arcuate projection 60 extends from the inner edge 52 of the second lever 26 convexly towards the slot 18 in the first lever 12 and terminates in a substantial axial alignment with the slot 18. The projection 60 has teeth 62 on an outer periphery for engaging and forcing the adjustable end 22 of the clothes line 24 in the slot towards and through the jaws 14 and 28 when the handle ends 16 and 30 are moved toward each other.

In use, one end of the clothes line 34 is inserted into aperture 32 and secured thereto by knotting the end 34. The clothes line 24 is then pased around spaced apart pulleys 64 and 66 so as to permit clothes 68 to be hung therefrom. The other end 22 of clothes line 24 is then passed through the aperture 20 and down the longitudinal slot 18 to pass between jaw ends 14 and 28 and is then free to dangle loosely. The tension of the clothes line 24 and action of the spring 44 or 58 causes the handle ends 16 and 30 to spread apart so that the jaw ends 14 and 28 firmly grip the adjustable end 22. To take up the clothes line 24 additionally, the adjustable end 22 is simple pulled. To loosen the clothes line 24, the jaw ends 14 and 28 are forced to spread apart so that the adjustable end 22 can pass upward therebetween.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A jiffy sure grip line holder comprising:
   (a) a first lever being of a channel construction, with a jaw formed at one end and a handle formed at another end, said first lever having a longitudinal slot therethrough and an aperture in the handle at a right angle to the longitudinal slot so as to receive an adjustable end of a clothes line therethrough;

(b) a second lever with a ratcheted jaw formed at one end and a handle formed at another end, said second lever having a transverse aperture in said handle for tying another end of the clothes line thereto;

(c) means for pivotally attaching said first lever and said second lever between their centers whereby line tension pivots said jaws towards each other;

(d) means for biasing the handle of said second lever away from the handle of said first lever so that the ratcheted jaw of said second lever will be retained within said longitudinal slot of said first lever to normally grip the adjustable end of the clothes line, until the handle of said first lever and the handle of said second lever are manually squeezed together to move the ratcheted jaw of said second lever away from the longitudinal slot to release the adjustable end of the clothes line.

2. A jiffy sure grip line holder as recited in claim 1, wherein said pivotally attaching means includes:

(a) a pair of ears extending from said first lever, said ears having aligned holes therethrough;

(b) said second lever having a hole therethrough; and (c) a pivot pin extending through the aligned holes in said ears and the hole in said second lever.

3. A jiffy sure grip line holder as recited in claim 2, wherein said biasing means includes a torsion spring carried on said pivot pin having one arm engaged with said second lever and another arm engaged with one of said ears.

4. A jiffy sure grip line holder as recited in claim 2, wherein said biasing means includes:

(a) a first post extending into an inner edge of the handle of said second lever;

(b) a second C-shaped post extending into the inner edges of the handle of said first lever; and (c) a compression spring affixed to and extending between said first post and said second C-shaped post; further including an arcuate projection extending from the inner edge of said second lever convexly towards the slot in said first lever and terminating in a substantial axial alignment with said slot, said projection having teeth on on outer periphery for engaging and forcing the adjustable end of the clothes line in the slot towards and through the jaws when the handles are moved towards each other.

* * * * *